United States Patent Office 3,538,411
Patented Nov. 3, 1970

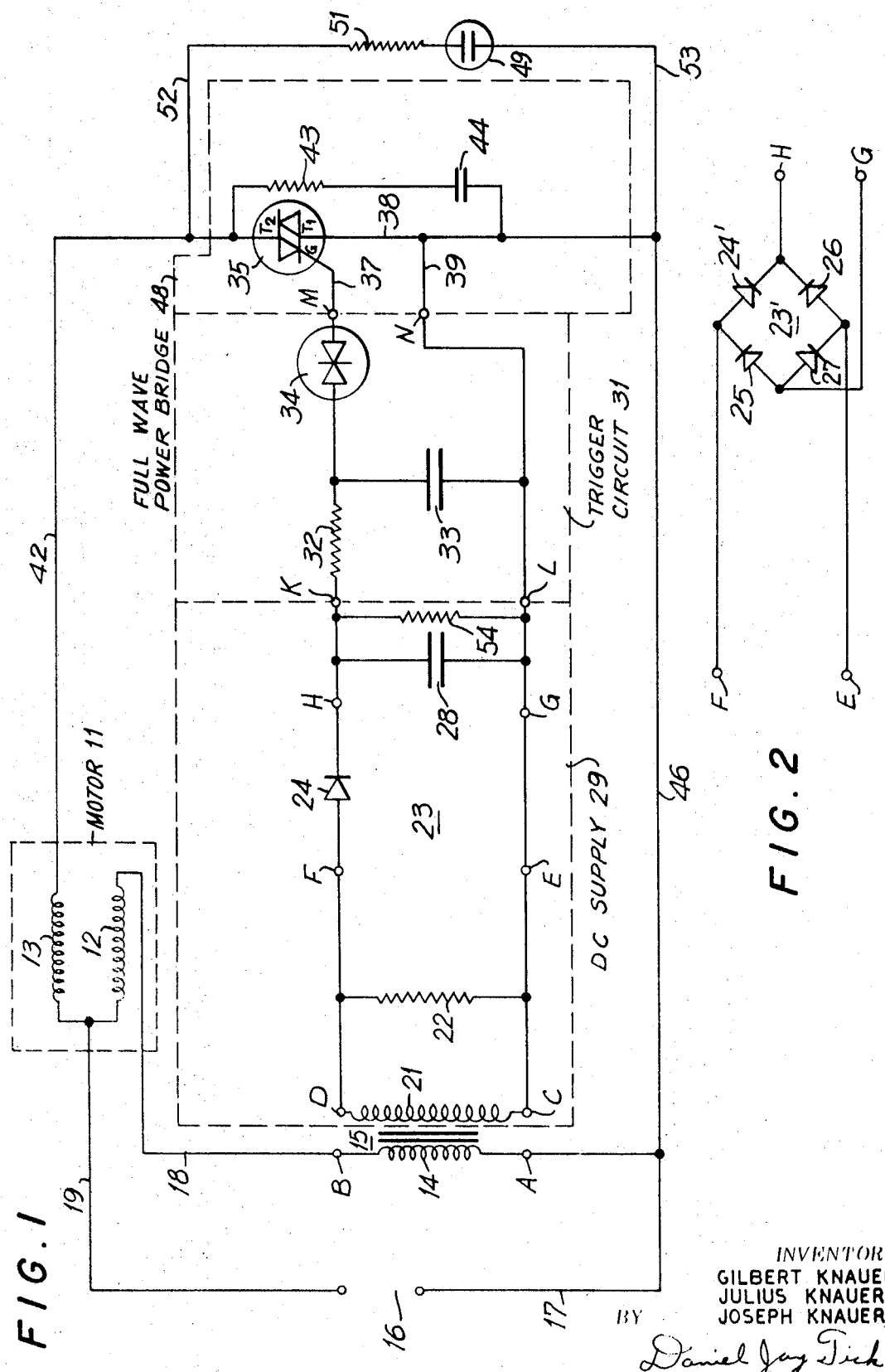

3,538,411
STARTING SWITCH CIRCUIT FOR SINGLE
PHASE ELECTRIC MOTORS
Gilbert Knauer, 1855 E. 12th St., Brooklyn, N.Y.
11229; Julius Knauer, 94 Woods Road, North Babylon,
N.Y. 11703; and Joseph Knauer, 1217 E. 98th St.,
Brooklyn, N.Y. 11219
Continuation-in-part of application Ser. No. 650,331,
June 30, 1967. This application Oct. 10, 1969, Ser.
No. 865,425
Int. Cl. H02p 5/40
U.S. Cl. 318—221　　　　　　　　　　　　　　8 Claims

ABSTRACT OF THE DISCLOSURE

A pulse producing circuit including a relaxation oscillator type trigger circuit is coupled between a source of AC voltage and the gate electrode of a Triac. The pulse producing circuit derives from the current through the main winding of a motor and applies to the gate electrode of the Triac a DC pulse having a magnitude which is sufficient to switch the Triac to its conductive condition each time the pulse is applied to the gate electrodes as long as the current through the main winding and the pulse are above determined magnitudes. The magnitude or amplitude levels of the pulse remains constant as the current through the main winding increases although the frequency of the pulses increases with increased current. The magnitude of the current through the main winding and the magnitude of the pulse fall below the corresponding determined amplitudes when the speed of the electric motor increases above a determined speed. The Triac couples the starting winding of the motor to the source of AC voltage so that it connects the starting winding to the AC source when it is in conductive condition and it disconnects the starting winding from the AC source when it is in nonconductive condition.

CROSS REFERENCE TO RELATED APPLICATION

The present application is a continuation-in-part of copending patent application Ser. No. 650,331, filed June 30, 1967, now Pat. No. 3,489,969, for "Starting Switch Circuit for Single Phase Electric Motors."

The present invention strives for the same objectives as patent application Ser. No. 592,008, filed Nov. 4, 1966, for "Starting Switch Circuit for Single Phase Electric Motors," now abandoned.

BACKGROUND OF THE INVENTION

Field of the invention

The present invention relates to a starting switch circuit for single phase electric motors. More particularly, the invention relates to a Triac circuit for starting or switching single phase electric motors.

Description of the prior art

In starting switch circuits of the prior art for starting electric motors, mechanical switches are utilized. The mechanical switches may comprise, for example, conventional centrifugal switches or relays and are subject to arcing, considerable wear of moving parts and difficulties such as, for example, unreliability of operation and the like. Furthermore, starting switch circuits of the prior art are critical in operating characteristics, so that they must be adjusted for each motor they are utilized with.

SUMMARY OF THE INVENTION

The principal object of the present invention is to provide a new and improved starting switch circuit for single phase electric motors. The operating characteristics of the starting switch circuit of the present invention are noncritical, so that it does not require adjustment for each motor it is utilized with. The starting switch circuit of the present invention is compact, rugged, reliable, efficient, and effective in operation, devoid of moving parts, and simple in structure and in its connections to an electric motor circuit. The starting switch circuit of the present invention does not require inspection, maintenance or repair and does not arc or wear. The starting switch circuit of the present invention is safe to use and may be utilized without difficulty or danger in dangerous locations. The starting switch circuit of the present invention may be encapsulated with facility and may be housed in a normal splice or terminal box with convenience and without concern or difficulty even if it contacts wire or metal therein.

The starting switch circuit of the present invention is noncritical because it switches ON and switches OFF at the same magnitude or level of current. The noncritical characteristic of the starting switch circuit of the present invention, which may be termed nondifferential or pull in and drop out, enables the utilization of said starting switch circuit in a wider range of applications than critical switches. The starting switch circuit of the present invention, due to its noncritical or nondifferential characteristic, is less sensitive to dynamic changes in current through the main winding of the motor caused by line voltage fluctuations.

In accordance with the present invention, a noncritical starting switch circuit for an electric motor having a main winding and a starting winding comprises a source of AC voltage having a determined frequency coupled to the main winding for energizing the main winding and the starting winding. A coupling circuit couples the starting winding to the source of AC voltage. The coupling circuit comprises a Triac having a conductive condition and a nonconductive condition and gate means for controlling the conductive condition of the Triac. A pulse producing circuit includes relaxation oscillator type trigger circuit coupled between the source of AC voltage and the gate means of the Triac for deriving from the current through the main winding and applying to the gate means a pulse having a magnitude sufficient to switch the Triac to its conductive condition each time the pulse is applied to the gate means as long as the current through the main winding and the pulse are above determined magnitudes. The magnitude of the current through the main winding and the magnitude of the pulse fall below the corresponding determined magnitudes when the speed of the electric motor increases above a determined speed. The Triac connects the starting winding to the source of AC voltage when it is in its conductive condition and disconnects the starting winding from the source of AC voltage when it is in its nonconductive condition.

The gate means of the Triac comprises a gate electrode connected to the relaxation oscillator type trigger circuit of the pulse producing circuit. The coupling circuit comprises a rectifier bridge having an output. A relaxation oscillator type trigger circuit has an input connected to the output of the rectifier bridge and an output. The Triac is connected to the output of the relaxation oscillator type trigger circuit. The relaxation oscillator type trigger circuit has two output terminals.

A smoothing capacitor is connected across the output of the rectifier bridge and a calibrating resistor is connected in the input of the rectifier bridge. A signal device is connected across the Triac for indicating the conductive condition thereof. The signal device is connected between the terminals of the Triac.

BRIEF DESCRIPTION OF THE DRAWING

In order that the present invention may be readily carried into effect, it will now be described with reference to the accompanying drawing, wherein:

FIG. 1 is a circuit diagram of an embodiment of the starting switch circuit of the present invention for single phase electric motors; and FIG. 2 is an embodiment of a rectifier which may replace the rectifier of FIG. 1.

DESCRIPTION OF THE PREFERRED EMBODIMENT

In FIG. 1, a single phase electric motor 11 comprises a main stator winding 12 and a starting or phase winding 13. If desired, the motor 11 may further comprise a starting capacitor (not shown in the figures) connected in series with the starting winding 13. The rotor of the electric motor 11 is not shown in FIG. 1 in order to enhance the clarity of illustration.

The main winding 12 of the electric motor 11 is connected in series with the primary winding 14 of a transformer 15 and a power source 16 of AC voltage of approximately 115 to 120, or 230 volts, or of any suitable voltage at any suitable power frequency such as, for example, 30, 50, 60, or any suitable number of cycles per second. Thus, one end terminal A of the primary winding 14 is connected to one terminal of the AC source 16 via a line 17. The other end terminal B of the primary winding 14 is connected to one end of the main winding 12 via a line 18 and the other end of said main winding is connected to the other terminal of the AC source 16 via a line 19.

The transformer 15 functions as a current sensor and produces at its secondary winding 21 a secondary voltage proportional to the primary current in its primary winding 14. A calibrating resistor 22 is connected across the terminals C and D of the secondary winding 21 of the transformer 15. The calibrating resistor 22 is utilized to calibrate the starting switch circuit for use with different motors. The calibrating resistor 22 is connected across the input terminals E and F of a half wave rectifier 23.

Although the calibrating resistor 22 is illustrated in FIG. 1 as a shunt resistor, connected across the terminals C and D of the secondary winding 21 of the transistor 15 and across the input terminals E and F of the half wave rectifier 23, any suitable type and connection of calibrating resistor may be utilized. Thus, for example, a voltage divider or variable resistor may be utilized as the calibrating resistor of FIG. 1. A series connected resistor may be utilized as the calibrating resistor of FIG. 1.

The rectifier bridge 23 may comprise any suitable rectifier arrangement for rectifying AC to DC such as, for example, a full wave rectifier, as shown in FIG. 2, a half wave rectifier, as shown in FIG. 1, a center-tapped full wave rectifier, or other suitable type. The rectifier 23 has output terminals G and H. The full wave rectifier 23' of FIG. 2 is of known type and comprises suitable known rectifiers or diodes 24', 25, 26 and 27 such as, for example, silicon rectifiers connected in a known rectifier bridge circuit.

The DC signal provided at the output terminals G and H of the rectifier 23 is filtered or smoothed by any suitable filter arrangement such as, for example, a smoothing or filter capacitor 28 connected across said output terminals. The filtered or smoothed DC signals are provided at a pair of terminals K and L which function as the output terminals of the DC supply 29 and the input terminals of a relaxation oscillator type trigger circuit 31.

The calibrating resistor 22 need not be connected in the input of the rectifier 23, but may be connected in the output of said rectifier, either between said rectifier and the filter capacitor 28 or between said filter capacitor and the terminals K and L.

The relaxation oscillator type trigger circuit 31 may comprise any suitable type of relaxation oscillator which functions as a trigger circuit to provide a firing pulse to switch the Triac, as hereinafter described, to its conductive condition. A relaxation oscillator provides a markedly nonsinusoidal output waveform and is called a relaxation oscillator because its oscillations are characterized by sudden change or relaxation from one state of unstable equilibrium to another. Those oscillators having a circuit in which the oscillation is produced through the periodic charge and discharge of a capacitor in series with a resistor were first called relaxation oscillators. Accordingly, relaxation oscillators have often been defined as those in which combinations of resistance and capacitance determine the frequency.

The relaxation oscillator type trigger circuit 31 comprises an RC circuit having a resistor 32 and a capacitor 33, and an avalanche device 34 such as, for example, a neon lamp or a semiconductor device known as a Diac and manufactured by the General Electric Company. The resistor 32 is connected in series between the terminal K and one of the electrodes of the avalanche device 34. The capacitor 33 is connected between the terminal L and a common point in the connection between the resistor 32 and the avalanche device 34. The Diac is a known semiconductor device and is described in the "Silicon Controlled Rectifiier Manual," third edition, 1964, and fourth edition, 1966, General Electric Company, Auburn, N.Y. A Diac is a multilayer semiconductor trigger diode of the type described on pages 66 and 67 of the aforementioned 1964 edition.

The resistor 32 charges the capacitor 33 at a charging rate determined by the time constant R32C33 or the resistance of said resistor times the capacitance of said capacitor. When the voltage across the capacitor 33 reaches the breakdown or avalanche point of the avalanche device 34, the impedance of said avalanche device decreases abruptly and sharply so that said avalanche device provides at its output a sharp current pulse, of approximately 100 milliamperes. The pulse provided at the output terminal M of the trigger circuit 31 has sufficient magnitude to fire a Triac 35 in accordance with the cycling of the voltage provided by the source 16 of AC voltage.

A Triac is a known semiconductor device and is described in the "Silicon Controlled Rectifier Manual," fourth edition, 1966, General Electric Company, Auburn, N.Y. A Triac conducts current in opposite directions and serves both to control and rectify. The Triac is an ON-OFF switch and can be turned on by a momentary such as, for example, fraction of a microsecond, application of control current to its control electrode or gate. A Triac is a multilayer solid state thyristor of the type described on pages 9 to 16 and 133 to 148 of the aforedescribed 1966 edition. The Triac permits current to flow or be blocked in either direction and has a single gate lead, so that a single source trigger 31 may be utilized. A Triac is the equivalent of two SCR's back to back, but with a single gate lead.

When a positive voltage is applied across its terminals $T_1$ and $T_2$ and a positive signal is applied to the control, gate, or trigger electrode G, the Triac fires and conducts current. Once the Triac is fired, the trigger or firing pulse or signal may be removed without terminating its conductive condition. The conductive condition is terminated and the Triac is switched to its nonconductive condition when the positive voltage is removed from its terminals $T_1$ and $T_2$.

The trigger circuit 31 has two output terminals M and N. The gate of the Triac 35 is directly connected to the output terminal M via a line 37. One of the terminals $T_1$ of the Triac 35 is directly connected to the output terminal N via a line 38 and a line 39.

The other of the terminals $T_2$ of the Triac 35 is connected to one end of the starting or phase winding 13 of the motor 11 via a line 42. The terminal $T_1$ of the Triac 35 is connected to the other end of the starting winding 13 of the motor 11 via the line 38 and a line 46, the source 16 of AC voltage and the line 19. A commutation circuit is connected between the terminals $T_1$ and $T_2$ of the Triac for improving the $dV/dt$ capabilities of said Triac. The commutation circuit comprises a resistor 43 and a capacitor 44 connected in series circuit arrangement with said resistor.

The Triac 35 functions as a full wave power bridge 48, with the Triac 35 operating in its conductive condition for a determined full cycle of the line voltage provided by the AC source 16. Thus, the Triac operates in its conductive condition continuously.

A signal device 49, which may comprise a lamp, a buzzer, or any suitable electrical indicator or signaller, is connected across the Triac 35. The signal device 49 functions to indicate the condition of energization or conduction of the Triac 35. One terminal of the signal device 49 is connected to the terminal $T_2$ of the Triac 35 via a resistor 51, a line 52 and the line 42. The other terminal of the signal device 49 is connected to the terminal $T_1$ of the Triac 35 via a line 53 and the line 38.

When the Triac 35 is nonconductive, not firing, or OFF, the energizing circuit of the starting winding 13 of the motor 11 is open and said starting winding is disconnected from the AC source 16. When the Triac 35 is conductive, firing, or ON, the energizing circuit of the starting winding 13 of the motor 11 is closed and said starting winding is connected to the AC source 16.

The main winding 12 of the electric motor 11 and the primary winding 14 of the transformer 15 are energized by the AC source 16. Since the main winding 12 and the primary winding 14 are connected in series, the same current flows through both said windings. The output of the transformer 15 is proportional to the magnitude of the current flowing through its primary winding 14. When the electric motor 11 is started, the current through the main winding 12 has a high magnitude which, after rectification and shaping, is of sufficient magnitude to fire the Triac 35, so that said Triac is conductive or ON for a full cycle, and the starting winding 13 of said motor is connected in the circuit and is energized. The Triac 35 is triggered by approximately 50 pulses per cycle or 3000 pulses per second.

As the speed of the electric motor 11 increases, the current through the main winding 12 decreases in magnitude, until it falls to a magnitude which, after rectification and shaping, is insufficient to fire the Triac 35, so that said Triac is switched OFF or to its nonconductive condition, and the starting winding 13 of said motor is disconnected from the circuit and is deenergized.

Since the Triac 35 is fired by 3000 pulses per second, the operating characteristic of the starting switch circuit of the present invention is noncritical, so that said circuit does not require adjustment for each motor it is utilized with. This is a considerable advantage over known starting switch circuits, which require adjustment for each motor they are used with. The pulses remain constant in magnitude after firing of the Triac, as the current in the main winding 12 increases. The pulses are unaffected by temperature changes since the Diac 34 is temperature stable. The frequency or repetition rate of the pulses varies with variation of the magnitude of the current through the main winding 12.

The firing point, at which the Triac is fired, is the same as the dropout point, at which said Triac is switched OFF.

A resistor 54 is connected in shunt across the filter capacitor 28. The resistor 54 functions as a bleeder to bleed off the capacitor 28 charge in order to provide an instantaneous release.

While the invention has been described by means of specific examples and in specific embodiments, we do not wish to be limited thereto, for obvious modifications will occur to those skilled in the art without departing from the spirit and scope of the invention.

What we claim is:

1. A noncritical starting switch circuit for an electric motor having a main winding and a starting winding, said starting switch circuit comprising a source of AC voltage having a determined frequency coupled to said main winding for energizing said main winding and said starting winding;

coupling means coupling said starting winding to said source of AC voltage, said coupling means comprising Triac means having a conductive condition and a nonconductive condition and gate means for controlling the conductive condition thereof; and pulse producing means including a relaxation oscillator type trigger circuit coupled between said source of AC voltage and the gate means of said Triac means for deriving from the current through said main winding and applying to said gate means a pulse having a magnitude sufficient to switch said Triac means to its conductive condition each time said pulse is applied to said gate means as long as the current through said main winding and said pulse are above determined magnitudes, the magnitude of the current through said main winding and therefore the magnitude of said pulse falling below the corresponding determined magnitudes when the speed of said electric motor increases above a determined speed, said Triac means connecting said starting winding to said source of AC voltage when it is in its conductive condition and disconnecting said starting winding from said source of AC voltage when it is in its nonconductive condition.

2. A noncritical starting switch circuit as claimed in claim 1, wherein said Triac means comprises a Triac having a pair of terminals and a commutation circuit connected between the terminals of said Triac, said commutation circuit comprising a resistor and a capacitor connected in series circuit arrangement with said resistor.

3. A noncritical starting switch circuit as claimed in claim 1, wherein said coupling means comprises a rectifier having an output, a relaxation oscillator type trigger circuit having an input connected to the output of said rectifier and an output, and Triac means connected to the output of said relaxation oscillator type trigger circuit.

4. A noncritical starting switch circuit as claimed in claim 2, wherein said relaxation oscillator type trigger circuit has two output terminals and one of the terminals of said Triac is directly connected to one of said output terminals and to said source of AC voltage, the other of the terminals of said Triac is connected to said source of AC voltage and the gate means of said Triac is directly connected to the other of said output terminals.

5. A noncritical starting switch circuit as claimed in claim 3, further comprising a smoothing capacitor connected across the output of said rectifier and a calibrating resistor, said rectifier having an input and said calibrating resistor being connected in the input of said rectifier.

6. A noncritical starting switch circuit as claimed in claim 3, wherein said relaxation oscillator type trigger circuit comprises a multilayer semiconductor trigger diode.

7. A noncritical starting switch circuit as claimed in claim 4, wherein said rectifier comprises a full wave rectifier bridge having an input and an output and said pulse producing means includes a relaxation oscillator type trigger circuit connected to the output of said full wave rectifier bridge, and further comprising a calibrating resistor connected in the input of said full wave rectifier bridge.

8. A noncritical starting switch circuit as claimed in claim 4, further comprising signal means connected between the terminals of said Triac for indicating the conductive condition thereof.

References Cited

UNITED STATES PATENTS

| | | | |
|---|---|---|---|
| 3,307,093 | 2/1967 | Wright | 318—221 |
| 3,376,484 | 4/1968 | Lewus | 318—227 XR |
| 3,421,064 | 1/1969 | Phillips | 318—221 XR |

ORIS L. RADER, Primary Examiner

G. Z. RUBINSON, Assistant Examiner

U.S. Cl. X.R.

318—227